(12) United States Patent
Holzschuh et al.

(10) Patent No.: US 11,254,794 B2
(45) Date of Patent: Feb. 22, 2022

(54) DIPPING BATH COMPOSITIONS FOR TREATING REINFORCING INSERTS

(71) Applicant: EMS-PATENT AG, Domat/Ems (CH)

(72) Inventors: Martin Holzschuh, Domat/Ems (CH); Andreas Kaplan, Chur (CH)

(73) Assignee: EMS-Patent AG, Domat/Ems (CH)

( * ) Notice: Subject to any disclaimer, the term of this patent is extended or adjusted under 35 U.S.C. 154(b) by 177 days.

(21) Appl. No.: 16/515,151

(22) Filed: Jul. 18, 2019

(65) Prior Publication Data

US 2020/0024416 A1  Jan. 23, 2020

(30) Foreign Application Priority Data

Jul. 19, 2018 (EP) ..................................... 18184510

(51) Int. Cl.

| | | |
|---|---|---|
| C08J 7/04 | (2020.01) | |
| B05D 1/18 | (2006.01) | |
| C08G 18/67 | (2006.01) | |
| C08G 18/69 | (2006.01) | |
| C08G 18/80 | (2006.01) | |
| B60C 1/00 | (2006.01) | |
| C09J 11/06 | (2006.01) | |
| C09J 175/00 | (2006.01) | |
| C08G 18/76 | (2006.01) | |
| C08K 5/29 | (2006.01) | |
| B29D 30/06 | (2006.01) | |
| B29D 30/00 | (2006.01) | |

(52) U.S. Cl.
CPC .............. *C08J 7/0427* (2020.01); *B05D 1/18* (2013.01); *B60C 1/0041* (2013.01); *C08G 18/672* (2013.01); *C08G 18/69* (2013.01); *C08G 18/7664* (2013.01); *C08G 18/8061* (2013.01); *C08G 18/8074* (2013.01); *C09J 11/06* (2013.01); *C09J 175/00* (2013.01); *B29D 30/0061* (2013.01); *B29D 30/0603* (2013.01); *B60C 2001/0066* (2013.01); *B60C 2001/0083* (2013.01); *C08G 2170/80* (2013.01); *C08K 5/29* (2013.01); *C09J 2301/312* (2020.08)

(58) Field of Classification Search
CPC ........ C08J 7/0427; C09J 175/00; C09J 11/06; C09J 2301/312; C08G 18/542; C08G 18/8061; C08G 18/7664; C08G 18/8074; B05D 1/18; B60C 2001/0083; B60C 2001/0066; B60C 1/0041; B29D 30/0603; B29D 30/0061
See application file for complete search history.

(56) References Cited

U.S. PATENT DOCUMENTS

| | | | |
|---|---|---|---|
| 4,026,744 A | 5/1977 | Elmer | |
| 4,204,982 A | 5/1980 | Neubert | |
| 6,482,889 B1 | 11/2002 | Kurz | |
| 7,973,191 B2 | 7/2011 | Döring et al. | |
| 8,993,662 B2 | 3/2015 | Kaplan | |
| 9,359,532 B2 | 6/2016 | Kaplan | |
| 10,047,054 B2 | 8/2018 | Kaplan | |
| 10,294,385 B2 | 5/2019 | Cevahir et al. | |
| 2010/0069657 A1 | 3/2010 | Döring et al. | |
| 2010/0168423 A1 | 7/2010 | Döring et al. | |
| 2012/0115993 A1 | 5/2012 | Kaplan | |
| 2014/0135458 A1 | 5/2014 | Kaplan | |
| 2015/0051343 A1 | 2/2015 | Kaplan | |
| 2015/0126701 A1 | 5/2015 | Liedloff et al. | |
| 2015/0259560 A1 | 9/2015 | Cevahir et al. | |

FOREIGN PATENT DOCUMENTS

| | | | |
|---|---|---|---|
| CN | 109267350 A | * 1/2019 | .......... D06M 15/564 |
| EP | 1 038 899 A1 | 9/2000 | |
| EP | 3 258 008 A1 | 12/2017 | |
| JP | H03-97965 A | 4/1991 | |
| JP | 2003-221787 A | 8/2003 | |
| WO | WO 00/05287 A2 | 3/2000 | |
| WO | WO 2014/091376 A1 | 6/2014 | |
| WO | WO 2014/175844 A2 | 10/2014 | |
| WO | WO 2015/188939 A1 | 12/2015 | |

OTHER PUBLICATIONS

CN-109267350-A_Jan. 2019_English Translation.*

(Continued)

*Primary Examiner* — Michael L Leonard

(74) *Attorney, Agent, or Firm* — Leydig, Voit & Mayer, Ltd.

(57) ABSTRACT

The present invention relates to an aqueous, solids-containing dipping bath composition for treating reinforcing inserts for rubber products comprising the following components or consisting of these components, (A) at least one blocked MDI mixture, the MDI mixture comprising MDI oligomers of formula (I), n being a whole number from 1 to 8, and MDI monomers; (B) at least one latex; (C) at least one compound selected from the group consisting of polyacrylates, lignin derivatives and mixtures hereof; and (D) possibly at least one additive; the dipping bath composition being essentially free of epoxides, and the dipping bath composition being essentially free of resorcinol, formaldehyde and the reaction products thereof.

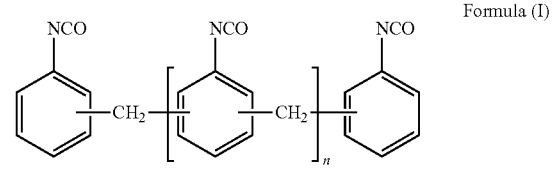

Formula (I)

18 Claims, No Drawings

(56) References Cited

OTHER PUBLICATIONS

European Patent Office, Extended European Search Report in European Patent Application No. 18 184 510.8 (dated Oct. 11, 2018).
U.S. Appl. No. 12/540,007, filed Aug. 12, 2009.
U.S. Appl. No. 12/539,972, filed Aug. 12, 2009.
U.S. Appl. No. 13/290,718, filed Nov. 7, 2011.
U.S. Appl. No. 14/078,134, filed Nov. 12, 2013.
U.S. Appl. No. 14/221,930, filed Mar. 21, 2014.
U.S. Appl. No. 14/397,529, filed Oct. 28, 2014.
U.S. Appl. No. 16/515,119, filed Jul. 18, 2019.

* cited by examiner

DIPPING BATH COMPOSITIONS FOR TREATING REINFORCING INSERTS

CROSS-REFERENCE TO A RELATED APPLICATION

This patent application claims the benefit of European Patent Application No. 18 184 510.8, filed on Jul. 19, 2018, the disclosure of which is incorporated herein by reference in its entirety for all purposes.

BACKGROUND OF THE INVENTION

The present invention relates to dipping bath compositions for treating reinforcing inserts and use thereof for producing reinforced rubber products. In addition, the present invention relates to methods for producing an adhesive reinforcing insert.

In the production of reinforced rubber products, it has proved advantageous if, for improving the adhesion, an adhesive is used between reinforcing insert and the rubber. Such an adhesive is important in particular in the field of tyre cord as reinforcing insert and in other highly-loaded composite materials with reinforcing fibres. In particular for application in the tyre cord field, it has become known to use resorcinol-formaldehyde latex systems (RFL) for connecting synthetic fibres to rubber products. The components resorcinol and formaldehyde of RFL are classified however as health-damaging and it is therefore advantageous to avoid their use.

Adhesives for producing adhesive reinforcing inserts are already known from the state of the art.

WO 2014/175844 A1 describes a dipping bath composition which makes it possible that the synthetic fibre, which is environmentally friendly and is used in the production of cord fabric, and the rubber are fixed together by a phase being provided between the two structures. A dipping solution which comprises more environmentally friendly chemicals is provided, the desired effect being achieved by treating cord fabrics over a fairly short time duration, and which enables the production of cords in the desired colours, because of their pale yellowish colour.

WO 2015/188939 A1 relates to a formaldehyde- and resorcinol-free dipping solution for cord fabric and a production method for this comprising the following steps. Adding acrylic polymer resin to water, adjusting the pH value, adding epoxide to the composition, adding polyisocyanate to the composition, adding latex to the composition, obtaining the dipping material; making it possible that the synthetic fibre and the rubber which are used in the production of rubber materials reinforced with cord fabric are fixed together by an interface being provided between two of the mentioned materials.

U.S. Pat. No. 4,204,982 describes rubber mixtures which are bonded to tyre cords using a dipping method. The dipping bath comprises an alkaline aqueous dispersion of a mixture with a main weight proportion of a rubber-like carboxylated diene copolymer and a lesser quantity of a lignin amine-formaldehyde reaction product.

U.S. Pat. No. 4,026,744 describes rubber compounds which are connected with reinforcing elements, in particular tyre cords made of glass fibres, using a one-step dipping method. The dipping bath comprises an alkaline aqueous dispersion of a mixture of a main weight quantity of a rubber-like vinyl pyridine/styrene/butadiene terpolymer and a lignin sulphonate-resorcinol-formaldehyde reaction product.

The dipping baths known from the state of the art comprise, in addition to the resorcinol-formaldehyde latex systems, also epoxides. Epoxides are used in order to achieve adhesion properties. The use of epoxides in dipping baths entails however some disadvantages. On the one hand, epoxides cause foaming of the dipping bath compositions, it is therefore necessary to add defoamers. On the other hand, the storability of the dipping bath compositions is reduced by the addition of epoxides. Furthermore, the solution of epoxides requires high shearing forces and demands a great deal of time. Incomplete dissolving of the epoxides leads to defects in the coating of the reinforcing insert and hence to adhesion problems. Without the addition of epoxides it is however impossible, using the dipping baths known from the state of the art, to produce reinforced rubber products which have good adhesion properties, in particular good peel adhesion and a good degree of surface covering after the peel adhesion test.

Starting therefrom, it was the object of the present invention to provide a dipping bath composition which makes it possible to produce reinforced rubber products which have very good adhesion properties, in particular very good peel adhesion and a good degree of surface covering after the peel adhesion test, without the above-discussed problems—resulting from the use of epoxides—occurring. In addition, the use of resorcinol-formaldehyde latex systems, which comprise the health-damaging materials resorcinol and formaldehyde is intended to be avoided. This object is achieved by the aqueous, solids-containing dipping bath composition according to the invention for treating reinforcing inserts, which comprises the following components or consists of these components:

(A) at least one blocked methylene diphenyl isocyanate (=MDI) mixture,
   the MDI mixture comprising MDI oligomers of formula (I), n being a whole number from 1 to 8,

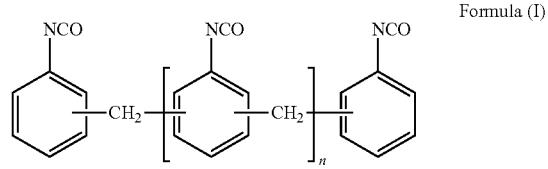

Formula (I)

and MDI monomers;
(B) at least one latex;
(C) at least one compound selected from the group consisting of polyacrylates, lignin derivatives and mixtures hereof; and
(D) possibly at least one additive;
   the dipping bath composition being essentially free of epoxides, and
   wherein the dipping bath is essentially free of resorcinol, formaldehyde and the reaction products thereof.

Preferred embodiments of the dipping bath composition according to the invention are described herein.

A method for producing an adhesive reinforcing insert and preferred embodiments of this method are also described herein.

An adhesive reinforcing insert, producible according to the method according to the invention and the use of this adhesive reinforcing insert for the production of reinforced rubber products is also described herein.

Lastly, the use of the dipping bath composition according to the invention for coating reinforcing inserts for rubber products is also described herein.

Terminology Definitions

The term "blocked" in the sense of the present invention means a reversible blocking of the isocyanate function. A complete blocking, which is achieved by using the blocking means in hyperstoichiometric quantities, is thereby preferred.

The dipping bath compositions according to the invention are aqueous, i.e. water is used as liquid phase. Water is not listed in the following as component of the dipping bath composition. Preferably, the dipping bath composition is essentially free of organic solvents, i.e. of organic liquids which do not participate in the reactions. Essentially free means that there are contained less than 5% by weight, preferably less than 2% by weight, of organic solvents, relative to the total weight of the dipping bath composition. Preferably, the dipping bath composition is completely free of organic solvents.

Furthermore, the dipping bath composition according to the invention is essentially free of epoxides, i.e. there are less than 0.7% by weight, preferably less than 0.4% by weight, particularly preferably less than 0.16% by weight, relative to the total weight of the dipping bath composition. Preferably, the dipping bath compositions are completely free of epoxides.

In addition, the dipping bath composition according to the invention is essentially free of resorcinol and formaldehyde and the reaction products thereof, i.e. there are in total less than 1.0% by weight, preferably less 0.5% by weight, particularly preferably less than 0.16% by weight, respectively relative to the total weight of the dipping bath composition. Preferably, the dipping bath compositions are completely free of resorcinol and formaldehyde and the reaction products thereof.

The MDI mixture according to the present invention comprises components (i), (ii) and possibly (iii) or preferably consists exclusively of these, the proviso applies thereby that components (i), (ii) and (iii) add up in total to 100% by weight. The fixed ranges of the quantity data for the individual components (i), (ii) and (iii) should be understood such that, within the prescribed ranges, an arbitrary quantity can be selected for each of the individual components provided the strict proviso is fulfilled that the sum of all the components (i) to (iii) produces 100% by weight.

The terms "comprising" and "including" in the present claims and in the description mean that further components are not excluded. Within the scope of the present invention, the term "consisting of" should be understood as preferred embodiment of the terms "comprising" or "including". If it is defined that a group "comprises" at least a specific number of components or "includes" these, this should also be understood such that a group is disclosed which "consists" preferably of these components.

Dipping Bath Composition

In the following, preferred embodiments of the dipping bath composition according to the invention are indicated.

According to a preferred embodiment of the present invention, the solids proportion of the dipping bath composition is 2 to 40% by weight, preferably 3 to 35% by weight and particularly preferably 5 to 30% by weight and most preferably 9 to 16% by weight, relative to the total weight of the dipping bath composition.

Another preferred embodiment provides that the aqueous solids-containing dipping bath composition has the following composition, the parts by weight respectively relating to the total weight of the dipping bath composition:
- (A) 0.1 to 25 parts by weight, preferably 0.2 to 20 parts by weight, particularly preferably 1 to 17 parts by weight and most preferably 8 to 15 parts by weight;
- (B) 1 to 80 parts by weight, preferably 8 to 50 parts by weight, particularly preferably 15 to 45 parts by weight and most preferably 38 to 42 parts by weight;
- (C) 0.1 to 15 parts by weight, preferably 0.25 to 12 parts by weight, particularly preferably 0.4 to 8 parts by weight and most preferably 0.6 to 4 parts by weight; and
- (D) 0 to 20 parts by weight, preferably 0.1 to 10 parts by weight and particularly preferably 0.1 to 3 parts by weight.

According to another preferred embodiment of the present invention, the blocked MDI mixture (A) comprises MDI derivatives which are selected preferably from the group consisting of MDI uretdione, adducts of MDI and/or MDI oligomers with other compounds, preferably with polyethylene glycol and mixtures hereof.

A further preferred embodiment of the present invention provides that the MDI is selected from the group consisting of 4,4'-MDI, 2,4'-MDI, 2,2'-MDI and mixtures hereof, the proportion of 2,4'-MDI and 2,2'-MDI being less than 10% by weight, preferably less than 8% by weight and particularly preferably the proportion of 2,4'-MDI and 2,2'-MDI being from 0.1 to 6% by weight, relative to the MDI mixture, particularly preferably the mixture comprising one or more MDI oligomers, n in formula (I) being a whole number from 1 to 8 and preferably from 1 to 6.

According to another preferred embodiment according to the invention, the MDI mixture has the following composition:
- (i) 25 to 60% by weight, preferably 25 to 49.9% by weight, of MDI monomers;
- (ii) 40 to 75% by weight, preferably 50 to 74.9% by weight, of MDI oligomers; and
- (iii) 0 to 9% by weight, preferably 0.1 to 6% by weight, of MDI derivatives;

the proportions of components (i) to (iii) adding up to 100% by weight.

MDI mixtures of MDI oligomers of formula (I), MDI monomers and possibly MDI derivatives are commercially available with the name "polymeric MDI" (PMDI), e.g. as Voronate (DowDuPont), Suprasec (Huntsman), Elastoflex (BASF), Lupronat (BASF) or Autofroth (BASF).

According to a further preferred embodiment of the present invention, the at least one latex (B) is selected from the group consisting of styrene-butadiene-vinylpyridine copolymer, styrene-butadiene-vinylpyridine copolymer modified with carboxylic acid, styrene-butadiene copolymer, styrene-butadiene copolymer modified with carboxylic acid, nitrile-butadiene copolymer, natural latex, chloroprene latex and mixtures hereof.

According to a further preferred embodiment of the present invention, the at least one compound (C) is selected from the group consisting of polymers based on (meth)acrylic acid esters, (meth)acrylic acid amines, (meth)acrylic acid amides, copolymers based on (meth)acrylic acid esters, (meth)acrylic acid amines, (meth)acrylic acid amides, lignin sulphonates, lignin sulphonic acids and mixtures hereof.

According to a particularly preferred embodiment of the present invention, the at least one compound (C) is selected from the group consisting of polystyrene acrylates, polyacrylic acid esters, lignin sulphonic acid salts, lignin sulphonic acid esters, lignin sulphonic acid ethers, lignin sulphonic acids and mixtures hereof.

A further preferred embodiment of the present invention provides that the at least additive (D) is selected from the group consisting of surfactants, defoamers, fillers, colourants, preservatives, thickening agents, acids, lyes, multivalent alcohols and mixtures hereof.

According to a further preferred embodiment of the present invention, the MDI mixture (A) is blocked with a compound which is selected from the group consisting of monophenols in particular phenol, cresol, trimethylphenols and tert-butylphenols, lactams, in particular ε-caprolactam, δ-valerolactam and laurinlactam, oximes, in particular methylethylketoxime, methylamylketoxime and cyclohexanone oxime, enol-forming compounds, in particular acetic acid ester, acetyl acetone and also mixtures hereof. Preferably, the capping means is selected from the group consisting of monophenols, in particular phenol, cresol, trimethylphenols and tert.-butylphenols, lactams, in particular ε-caprolactam, δ-valerolactam and laurinlactam and mixtures hereof and particularly preferably the capping means is selected from the group consisting of phenol, ε-caprolactam and mixtures hereof. Most preferably, the MDI mixture (A) is blocked with ε-caprolactam.

A further preferred embodiment of the present invention provides that the average particle diameter $d_{50}$ of the blocked MDI mixture is at most 2 μm; preferably 0.6 to 1.5 μm.

According to another preferred embodiment of the present invention, the particle diameter $d_{100}$ of the blocked MDI mixture is at most 6 μm; preferably 0.6 to 5 μm.

According to a further preferred embodiment of the present invention, the blocked MDI mixture has a number-average molar mass $M_n$ in the range of 550 to 1,200 g/mol and preferably of 700 to 1,100 g/mol.

For producing a dipping bath, firstly deionised water is placed in a vessel, preferably in an agitated vessel, at room temperature and thereafter the components (A), (B), (C) and possibly (D) are stirred in, preferably the components are stirred in in the sequence (C), (A), possibly (D) and then (B) or in the sequence (C), (A), (B) and then possibly (D).

Method for Producing an Adhesive Reinforcing Insert

The present invention relates in addition to a method for producing an adhesive reinforcing insert which comprises at least the following steps:
  a) providing at least one reinforcing insert;
  b) dipping the prepared reinforcing insert in at least one dipping bath composition according to the invention as defined above;
  c) drying the reinforcing insert from step b) at 100 to 240° C.;
  d) annealing the coating of the reinforcing insert from step c) at 200 to 250° C.

In the following, preferred embodiments of the method according to the invention for producing an adhesive reinforcing insert are indicated.

According to a preferred embodiment of the present invention, step c) is effected at temperatures of 110 to 210° C. and preferably of 140 to 180° C.

According to a further preferred embodiment of the present invention, step d) is effected at temperatures of 220 to 240° C.

A further preferred embodiment of the present invention provides that the reinforcing insert is selected from a compound from the group consisting of polyamide 6, polyamide 66, polyethylene terephthalate, polyethylene naphthalate, rayon, aramide, cotton, basalt fibres, sisal, hemp, flax, coconut fibres and mixtures hereof.

According to another preferred embodiment of the present invention, the reinforcing insert is dipped, before step b), in an aqueous solids-containing dipping bath composition which comprises at least one blocked MDI mixture and which comprises preferably no other components, the MDI mixture comprising MDI oligomers of formula (I), n being a whole number from 1 to 8,

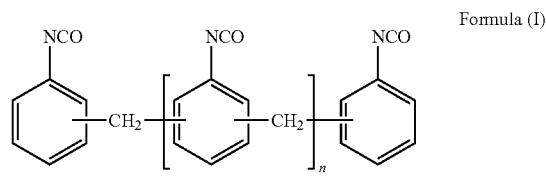

Formula (I)

and MDI monomers. After the dipping step, it is preferred that the drying and annealing of the layer is effected under the above-indicated conditions before step b) of the method according to the invention is implemented. Preferably, the drying is effected at temperatures of 110 to 210° C. and particularly preferably of 140 to 180° C. Furthermore, it is thereby preferred that the drying is implemented over a time period of 30 to 120 minutes. Furthermore, the annealing is implemented at temperatures of 220 to 240° C. Furthermore, it is thereby preferred that the annealing is implemented over a time period of 20 to 120 minutes.

Another preferred embodiment of the present invention provides that the pH value of the dipping bath composition before implementing step b) of the method according to the invention and before the at least one latex (B) is introduced into the dipping bath composition, is adjusted in the range of 8 to 12, preferably 9 to 11, i.e. the dipping bath composition before adjustment of the pH value comprises only components (A) and (C) and possibly (D). Preferably, ammonia solution is thereby used as base. It is particularly preferred to agitate the alkaline dipping bath composition comprising components (A), (B), (C) and possibly (D) before implementing step b) firstly over a time period of 12 to 48 hours and preferably for 20 to 28 hours. The at least one latex (B) is introduced into the dipping bath composition before implementing step b).

A tyre cord or another reinforcing insert can be coated in a conventional coating unit, the excess proportion of the dipping bath being removed with the help of a mechanical device and/or a vacuum suction at 1 to 5 mbar and the coating being dried firstly in an oven for 20 to 120 s at 100 to 240° C. and subsequently being annealed in a further oven for 20 to 120 s at 200 to 250° C.

Method for Producing a Reinforced Rubber Product

The present invention relates in addition to a method for producing a reinforced rubber product which comprises the following steps:
  (i) providing at least one layer of an adhesive reinforcing insert produced via the method according to the invention, as defined above;
  (ii) embedding at least one layer of an adhesive reinforcing insert from step (i) in a rubber matrix in a pressing mould;
  (iii) pressing the layers from step (ii);
  (iv) vulcanising the reinforced rubber product from step (iii) at 140 to 210° C. and 5 to 110 bar for 5 to 45 minutes;

(v) removing the reinforced rubber product from step (iv) from the pressing mould.

According to a preferred embodiment of the present invention, the reinforced rubber products concern tyres, both for cars, motorcycles and for commercial vehicles and aircraft and also technical rubber products, in particular conveyor belts, pneumatic springs, hoses and driving belts, e.g. V-belts, V-ribbed belts, round belts, flat belts or toothed belts.

Adhesive Reinforcing Insert

Furthermore, the present invention relates to an adhesive reinforcing insert which is producible according to the method according to the invention. Preferably, the adhesive reinforcing insert concerns a tyre cord.

Uses

In addition, the present invention relates to the use of the adhesive reinforcing insert according to the invention for the production of reinforced rubber products.

Furthermore, the present invention relates to the use of the dipping bath composition according to the invention for coating reinforcing inserts for rubber products.

The reinforced rubber products concern preferably tyres, both for cars, motorcycles and cycles and for commercial vehicles and aircraft and technical rubber products, in particular conveyor belts, pneumatic springs, hoses and driving belts, e.g. V-belts, V-ribbed belts, round belts, flat belts or toothed belts.

The subject according to the invention is intended to be explained in more detail with reference to the subsequent examples without wishing to restrict said subject to the specific embodiments shown here.

1 MEASURING METHODS

Within the scope of this application, the following measuring methods were used.

Particle Diameter ($d_{50}$ or $d_{100}$ Value)

The particle diameter was determined on a powder or on an aqueous dispersion according to ISO 13320 at 23° C. by means of laser diffraction. The laser measurements were implemented with a granulometer Cilas 1064 of Quantachrome GmbH (Germany).

Peel Adhesion

The peel adhesion was determined according to ASTM 4393. For this purpose, eight-layer test pieces with a symmetrical construction (2 layers of cord (=adhesive reinforcing insert) and 6 layers of rubber, cf. FIG. 2, ASTM 4393) were produced. The tensile test was effected at a measuring temperature of 23° C. with a tensile speed of 20 mm/min. The tensile test was evaluated according to Option 1 of ASTM 4393. As rubber, the GB rubber of the company Wuxi Segen Rubber Tech. Co., Ltd, China (thickness 0.4 mm) was used. The vulcanisation was effected under three different conditions, 160° C., 100 bar for 12.5 minutes, 170° C., 100 bar for 15 minutes and 170° C., 100 bar for 30 minutes.

Degree of Surface Covering

The degree of surface covering after the peel adhesion test was determined by a visual examination by the corresponding tyre material being compared with internal patterns which had a covering of 0 to 100%. A covering of 0% means that the adhesive reinforcing insert has detached completely from the rubber after the peel adhesion test, i.e. the breakage was effected in the boundary layer between tyre cord and rubber. A covering of 100% means conversely that no detachment of the adhesive reinforcing insert from the rubber was effected, i.e. the breakage was effected in the rubber.

Solids Content

The solids content is determined by evaporation in a halogen drier (Mettler Halogen drier HR 73). For this purpose, approx. 3 g of the dipping bath composition is distributed uniformly on the shell base in an aluminium shell (diameter: 95 mm). The test duration is 25 minutes at 80° C. In the case of the type of display, the dry type "dry content (100–0)" is chosen. The average of three determinations is indicated.

Number-Average Molar Mass (Mn)

Determination of the number-average molar mass (Mn) is effected by means of GPC (gel permeation chromatography) with UV detection.

For measurement, the samples are dissolved in THF (approx. 5 mg in 10 ml) and filtered into vials through disposable injection filters before filling.

Device: Waters 2690 Alliance

Software: Waters Millenium 32 GPC Module

Column: PLgel 100 Å, particle size 3 µm

Length 30.0 cm

Inner diameter 7.5 mm

Wavelength UV detector: 254 nm

Eluent: THF

Flow rate: 1.0 ml/min

The number-average molar mass (Mn) is determined with conventional calibration. The calibration is effected with polystyrene standards (masses 700, 1,100 and 2,000) and also laurinlactam (mass 197). Three determinations are implemented. The arithmetic mean of the molar mass is indicated in g/mol. The solvent THF with HPLC quality was obtained from EGT Chemie Switzerland. The disposable filters are obtainable at Macherey-Nagel GmbH & Co. KG, Germany, with the name Chromafil A-45/25 (pore size 0.45 µm, filter diameter 25 mm). The disposable syringes are obtainable at VWR International GmbH, Germany.

2 STARTING MATERIALS

The materials used in the examples and comparative examples are compiled in table 1.

TABLE 1

| | |
|---|---|
| CL-blocked MDI mixture (A1) | Aqueous dispersion of MDI mixture blocked with ε-caprolactam and surfactant[a]<br>Solids content: 50% by weight<br>Number-average molar mass $M_n$ of the MDI mixture blocked with ε-caprolactam: 740 g/mol<br>Volume-average particle diameter: $d_{50}$ = 1.2 µm, $d_{100}$ = 3.6 µm<br>Manufacturer: EMS-CHEMIE AG, Switzerland |
| CL-blocked low-molecular diisocyanate (A2) | Aqueous dispersion of 4,4'-diphenylmethane diisocyanate blocked with ε-caprolactam and surfactant<br>Solids content: 60% by weight<br>Number-average molar mass $M_n$ of 4,4'-diphenylmethane diisocyanate blocked with ε-caprolactam: 477 g/mol<br>Volume-average particle diameter:<br>$d_{50}$ = 0.9 µm, $d_{100}$ = 3.0 µm<br>Manufacturer: EMS-CHEMIE AG, Switzerland |
| VP Latex (B1) | Aqueous styrene-butadiene-vinylpyridine dispersion<br>Solids content: 41% by weight<br>Trade name: Pliocord VP 106<br>Manufacturer: OMNOVA Solutions, USA |
| SBR Latex (B2) | Aqueous styrene-1,3-butadiene copolymer dispersion<br>Solids content: 50% by weight<br>Trade name: Lipaton SB 5811<br>Manufacturer: Synthomer, Germany |

TABLE 1-continued

| | |
|---|---|
| Lignin sulphonate (C1) | Lignin sulphonic acid, sodium salt, marketed by Carl Roth GmbH + Co. KG, Germany |
| Polyacrylate (C2) | Aqueous polystyrene acrylate dispersion of polystyrene acrylate, neutralised with 13% by weight of aqueous $NH_3$ solution (25%)<br>Solids content: 43% by weight<br>Trade name: Joncryl 8085<br>Manufacturer: BASF SE, Germany |
| Polyacrylate (C3) | Aqueous dispersion with a modified polycarboxylic acid with a multivalent alcohol as crosslinking component<br>Solids content: 50% by weight<br>Trade name: Acrodur 950 L<br>Manufacturer: BASF SE, Germany |
| RFL (C4) | Aqueous dispersion of resorcinol, formaldehyde, styrene-butadiene-vinylpyridine latex<br>Weight ratio 1.0:0.6:9.2<br>Solids content: 20% by weight<br>Manufacturer: EMS-CHEMIE AG, Switzerland |
| Epoxide (C5) | Glycerol triglycidyl ether, liquid<br>Manufacturer: EMS-CHEMIE AG, Switzerland |
| Defoamer (D1) | Mineral oil-based defoamer, liquid<br>Trade name: Surfynol DF-220<br>Manufacturer: Air Products and Chemicals Inc., USA |

[a] The production of the blocked MDI mixture (A1) was effected by capping the product "Voronate M600" obtainable from DowDuPont with ε-caprolactam.

A polyester cord (1670×1×2 dtex, ZS 380, 1×50) of the company Longlaville Performance Fibers SAS was used as substrate.

As coating unit, a pilot unit of Mehler Engineering & Service GmbH, Fulda, Germany was used.

3 EXAMPLES AND COMPARATIVE EXAMPLES

In tables 2 and 3, the results of the examples and of the comparative examples according to the invention are compiled.

4 DISCUSSION OF THE RESULTS

The tyre cord according to examples 1 to 6 according to the invention and illustrated in table 2 shows throughout a higher peel adhesion and a higher degree of surface covering than the tyre cords according to comparative examples 7 to 13 displayed in table 3. It is thereby noteworthy that, by using the dipping bath according to the invention, in fact even better adhesion properties and degrees of surface covering were achieved than was possible by the addition of epoxides.

TABLE 2

Examples according to the invention.

| | | Examples | | | | | |
|---|---|---|---|---|---|---|---|
| | Unit | 1 | 2 | 3* | 4* | 5** | 6** |
| Components | | | | | | | |
| CL-capped MDI-Mixture (A1), Solids content 50% by weight | Parts by weight | 15 | 9.4 | 15 | 9.4 | 15 | 9.4 |
| Latex VP (B1) Solids content 41% by weight | Parts by weight | 40 | 40 | 40 | 40 | 40 | 40 |
| Lignin sulphonate (C1) | Parts by weight | 3 | — | 3 | — | 3 | — |
| Polyacrylate (C2) Solids content 43% by weight | Parts by weight | — | 1.2 | — | 1.2 | — | 1.2 |
| Water, deionised | Parts by weight | 142.0 | 149.4 | 142.0 | 149.4 | 142.0 | 149.4 |
| Solids content of the dipping bath composition | % by wt. | 13.5 | 10.8 | 13.5 | 10.8 | 13.5 | 10.8 |
| Measurements | | | | | | | |
| Peel adhesion | N/inch | | | | | | |
| 160° C., 12.5 min, 100 bar | | 290 | 284 | 338 | 332 | 349 | 349 |
| 170° C., 15 min, 100 bar | | 253 | 256 | 176 | 281 | 289 | 281 |
| 170° C., 30 min, 100 bar | | 203 | 175 | 224 | 198 | 218 | 170 |
| Degree of surface covering | % | | | | | | |
| 160° C., 12.5 min, 100 bar | | 70 | 78 | 77 | 63 | 40 | 83 |
| 170° C., 15 min, 100 bar | | 27 | 37 | 80 | 55 | 60 | 63 |
| 170° C., 30 min, 100 bar | | 23 | 23 | 57 | 42 | 62 | 42 |

*before the addition of the latex (B), i.e. the dipping bath comprised the components (A) and (C), the pH-value was adjusted with $NH_3$ solution (25%) to 10.3;
**before the addition of the latex (B), i.e. the dipping bath comprised the components (A) and (C), the pH-value was adjusted with $NH_3$ solution (25%) to 10.3 and the dipping bath composition comprising the components (A) to (C) was agitated for 24 hours.

TABLE 3

Comparative examples.

| | Unit | 7 | 8 | 9 | 10 | 11 | 12 | 13 |
|---|---|---|---|---|---|---|---|---|
| Components | | | | | | | | |
| CL-capped diisocyanate (A2), FG: 60% by weight | Parts by weight | 12.5 | 12.5 | 7.8 | 7.8 | 7.8 | 2.5 | 4.2 |
| Latex VP (B1), FG: 41% by weight | Parts by weight | 40 | 40 | 40 | 40 | 22.7 | 29.3 | — |
| Latex SBR (B2), FG: 50% by weight | Parts by weight | — | — | — | — | 4 | — | — |
| Lignin sulphonate (C1) | Parts by weight | 3 | 3 | — | — | — | — | — |
| Polyacrylate (C2), FG: 43% by weight | Parts by weight | — | — | 1.2 | 1.2 | 0.8 | — | — |
| Polyacrylate (C3), FG: 50% by weight | Parts by weight | — | — | — | — | — | 1.3 | — |
| RFL (C4), FG: 20% by weight | Parts by weight | — | — | — | — | — | — | 100 |
| Epoxide, liquid (C5) | Parts by weight | — | 1.05 | — | 1.05 | 3.3 | 0.9 | 1.05 |
| Defoamer, liquid (D1) | Parts by weight | — | 0.2 | — | 0.2 | 0.2 | 0.2 | 0.2 |
| Water, deionised | Parts by weight | 144.5 | 143.25 | 151.0 | 149.75 | 161.2 | 165.8 | 93.83 |
| FG of the dipping bath composition | % by weight | 13.5 | 14.0 | 10.8 | 11.4 | 9.9 | 7.6 | 11.8 |
| Measurements | | | | | | | | |
| Peel adhesion | N/inch | | | | | | | |
| 160° C., 12.5 min, 100 bar | | 107 | 262 | 98 | 221 | 237 | 152 | 232 |
| 170° C., 15 min, 100 bar | | * | 249 | * | * | 211 | * | 191 |
| 170° C., 30 min, 100 bar | | * | 200 | * | * | 155 | * | 143 |
| Degree of surface covering | % | | | | | | | |
| 160° C., 12.5 min, 100 bar | | 0 | 10 | 0 | 13 | 13 | 0 | 7 |
| 170° C., 15 min, 100 bar | | * | 10 | * | * | 17 | * | 12 |
| 170° C., 30 min, 100 bar | | * | 5 | * | * | 12 | * | 7 |

FG = Solids content,
* = not measured.

The invention claimed is:

1. An aqueous, solids-containing dipping bath composition for treating reinforcing inserts for rubber products comprising the following components:
(A) at least one blocked MDI mixture,
the MDI mixture comprising MDI oligomers of formula (I), n being a whole number from 1 to 8,

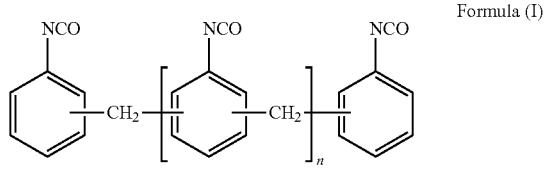

Formula (I)

and MDI monomers;
(B) at least one latex;
(C) at least one compound selected from the group consisting of polyacrylates, lignin derivatives and mixtures thereof; and
(D) optionally at least one additive;
wherein the dipping bath composition is essentially free of epoxides, and
the dipping bath composition being essentially free of resorcinol, formaldehyde, and the reaction products thereof.

2. The aqueous, solids-containing dipping bath composition according to claim 1, wherein the proportion of the solids is 2 to 40% by weight, relative to the total weight of the dipping bath composition.

3. The aqueous, solids-containing dipping bath composition according to claim 1, wherein the bath has the following composition, the parts by weight respectively relating to the total weight of the dipping bath composition:
(A) 0.1 to 25 parts by weight;
(B) 1 to 80 parts by weight;
(C) 0.1 to 15 parts by weight; and
(D) 0 to 20 parts by weight.

4. The aqueous, solids-containing dipping bath composition according to claim 1, wherein the blocked MDI mixture (A) comprises MDI derivatives which are selected from the group consisting of MDI uretdione, adducts of MDI, and MDI oligomers with other compounds.

5. The aqueous, solids-containing dipping bath composition according to claim 4, wherein the MDI is selected from the group consisting of 4,4'-MDI, 2,4'-MDI, 2,2'-MDI and mixtures thereof, the proportion of 2,4'-MDI and 2,2'-MDI being less than 10% by weight, relative to the MDI mixture.

6. The aqueous, solids-containing dipping bath composition according to claim 1, wherein the MDI mixture has the following composition:
(i) 25 to 60% by weight of MDI monomers;
(ii) 40 to 75% by weight of MDI oligomers; and
(iii) 0 to 9% by weight of MDI derivatives;

the proportions of components (i) to (iii) adding up to 100% by weight.

7. The aqueous, solids-containing dipping bath composition according to claim 1, wherein the at least one latex (B) is selected from the group consisting of styrene-butadiene-vinylpyridine copolymer, styrene-butadiene-vinylpyridine copolymer modified with carboxylic acid, styrene-butadiene copolymer, styrene-butadiene copolymer modified with carboxylic acid, nitrile-butadiene copolymer, natural latex, chloroprene latex, and mixtures thereof.

8. The aqueous, solids-containing dipping bath composition according to claim 1, wherein the at least one compound (C) is selected from the group consisting of polymers based on (meth)acrylic acid esters, (meth)acrylic acid amines, (meth)acrylic acid amides, copolymers based on (meth)acrylic acid esters, (meth)acrylic acid amines, (meth)acrylic acid amides, lignin sulphonates, lignin sulphonic acids, and mixtures thereof.

9. The aqueous, solids-containing dipping bath composition according to claim 1, wherein the at least one additive (D) is selected from the group consisting of surfactants, defoamers, fillers, colourants, preservatives, thickening agents, acids, lyes, multivalent alcohols, and mixtures thereof.

10. The aqueous, solids-containing dipping bath composition according to claim 1, wherein the MDI mixture (A) is blocked with a compound selected from the group consisting of monophenols, lactams, oximes, enol-forming compounds, acetic acid ester, acetyl acetone, and mixtures thereof.

11. The aqueous, solids-containing dipping bath composition according to claim 1, wherein:
the average particle diameter $d_{50}$ of the blocked MDI mixture is at most 2 μm;
the particle diameter $d_{100}$ of the blocked MDI mixture is at most 6 μm; and/or
the blocked MDI mixture has a number-average molar mass $M_n$ in the range of 550 to 1,200 g/mol.

12. A method for producing an adhesive reinforcing insert which comprises at least the following steps:
a) providing at least one reinforcing insert;
b) dipping the prepared reinforcing insert in at least one dipping bath composition according to claim 1;
c) drying the reinforcing insert from step b) at 100 to 240° C.; and
d) annealing the coating of the reinforcing insert from step c) at 200 to 250° C.

13. The method according to claim 12, wherein the reinforcing insert is selected from the group consisting of polyamide 6, polyamide 66, polyethylene terephthalate, polyethylene naphthalate, rayon, aramide, cotton, basalt fibres, sisal, hemp, flax, coconut fibres, and mixtures thereof.

14. The method according to claim 12, wherein:
the reinforcing insert is dipped, before step b), in an aqueous, solids-containing dipping bath composition which comprises at least one capped MDI mixture or which comprises no other components besides the at least one blocked MDI mixture,
the MDI mixture comprising MDI oligomers of formula (I), n being a whole number from 1 to 8,

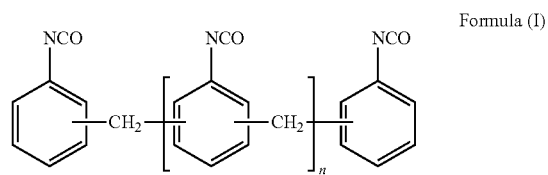

Formula (I)

and MDI monomers.

15. A method for producing a reinforced rubber product, which comprises the following steps:
(i) providing at least one layer of an adhesive reinforcing insert produced by the method according to claim 12;
(ii) embedding at least one layer of an adhesive reinforcing insert from step (i) in a rubber matrix in a pressing mould;
(iii) pressing the layers from step (ii);
(iv) vulcanising the reinforced rubber product from step (iii) at 140 to 210° C. and 5 to 110 bar for 5 to 45 minutes; and
(v) removing the reinforced rubber product from step (iv) from the pressing mould.

16. An adhesive reinforcing insert produced by the method according to claim 12.

17. A method for producing reinforced rubber products comprising utilizing the adhesive reinforcing insert according to claim 16.

18. A method for coating reinforcing inserts for rubber products comprising utilizing the aqueous, solids-containing dipping bath composition according to claim 1.

* * * * *